US011630711B2

United States Patent
Cai

(10) Patent No.: US 11,630,711 B2
(45) Date of Patent: Apr. 18, 2023

(54) ACCESS CONTROL CONFIGURATIONS FOR INTER-PROCESSOR COMMUNICATIONS

(71) Applicant: QUALCOMM Incorporated, San Diego, CA (US)

(72) Inventor: Liang Cai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/239,012

(22) Filed: Apr. 23, 2021

(65) Prior Publication Data

US 2022/0342729 A1    Oct. 27, 2022

(51) Int. Cl.
*G06F 9/54* (2006.01)
*G06F 12/0875* (2016.01)
*G06F 9/52* (2006.01)

(52) U.S. Cl.
CPC .......... *G06F 9/544* (2013.01); *G06F 9/526* (2013.01); *G06F 12/0875* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 2012/0110303 | A1* | 5/2012 | Dhanwada | G06F 15/17325 712/31 |
| 2013/0326180 | A1* | 12/2013 | Mamidala | G06F 15/167 711/E12.091 |
| 2014/0044265 | A1* | 2/2014 | Kocher | H04L 9/0897 380/277 |
| 2015/0052267 | A1* | 2/2015 | Egi | G06F 13/28 710/22 |
| 2022/0342573 | A1 | 10/2022 | Cai | |

\* cited by examiner

*Primary Examiner* — Craig C Dorais
(74) *Attorney, Agent, or Firm* — Holland & Hart LLP

(57) ABSTRACT

Methods, systems, and devices for access control configurations for inter-processor communications are described to support reconfiguration of a dynamic access control configuration at a device. For example, additional configuration fields may be added to existing access control rules of the device, where these additional fields may be configured by a processor sending information to a receiving processor, via a shared memory resource or region of the device. The additional fields may include a read-only value which may specify a processor which has exclusive write permission for a memory region of the share memory. This value may indicate the sending processor of the memory region, and the value may be set by access control hardware when the additional field is changed. Other processors of the device may be prevented from writing to the memory region.

18 Claims, 11 Drawing Sheets

ACCESS CONTROL CONFIGURATIONS FOR INTER-PROCESSOR COMMUNICATIONS

FIELD OF TECHNOLOGY

The following relates to inter-processor communications, including access control configurations for inter-processor communications.

BACKGROUND

Communications systems are widely deployed to provide various types of information. These systems may be capable of communication, processing, storage, and generation of information. Examples of communications systems include entertainment systems, information systems, virtual reality systems, model and simulation systems, and so on. These systems may employ a combination of hardware and software technologies to support processing, storage, and generation of the information, for example, such as devices, storage devices, communication networks, computer systems, and display devices. Some security configurations implemented for communications between processors of a device may increase device complexity and power usage at the device.

SUMMARY

The described techniques relate to improved methods, systems, devices, and apparatuses that support access control configurations for inter-processor communications. Generally, the described techniques provide for improved reconfiguration of a dynamic access control configuration at a device. For example, additional configuration fields may be added to existing access control rules of the device, where these additional fields may be configured by a processor sending information to a receiving processor, via a shared memory resource or region of the device. The additional fields may in some examples include a read-only value that may specify the processor that has exclusive write permission for a memory region of the share memory. This value may indicate the sending processor of the memory region, and the value may be set by access control hardware when the additional field is changed. Other processors of the device may be prevented from writing to the memory region.

A method for inter-processor communications at a device is described. The method may include determining a configuration for a memory component of the device, the configuration indicating a set of multiple processors that share the memory component and indicating one or more permissions for a memory resource of the memory component, assigning, to a first processor of the set of multiple processors, a permission to write to the memory resource based on the configuration, writing first information to the memory resource by the first processor based on the assigned permission to the first processor, and preventing a second processor of the set of multiple processors and a remainder of the set of multiple processors from writing to the memory resource based on the assigned permission to the first processor.

An apparatus for inter-processor communications at a device is described. The apparatus may include a plurality of processors, memory coupled with each of the plurality of processors, and instructions stored in the memory and executable by the plurality of processors to cause the apparatus to determine a configuration for a memory component of the device, the configuration indicating a set of multiple processors that share the memory component and indicating one or more permissions for a memory resource of the memory component, assign, to a first processor of the set of multiple processors, a permission to write to the memory resource based on the configuration, write first information to the memory resource by the first processor based on the assigned permission to the first processor, and prevent a second processor of the set of multiple processors and a remainder of the set of multiple processors from writing to the memory resource based on the assigned permission to the first processor.

Another apparatus for inter-processor communications at a device is described. The apparatus may include means for determining a configuration for a memory component of the device, the configuration indicating a set of multiple processors that share the memory component and indicating one or more permissions for a memory resource of the memory component, means for assigning, to a first processor of the set of multiple processors, a permission to write to the memory resource based on the configuration, means for writing first information to the memory resource by the first processor based on the assigned permission to the first processor, and means for preventing a second processor of the set of multiple processors and a remainder of the set of multiple processors from writing to the memory resource based on the assigned permission to the first processor.

A non-transitory computer-readable medium storing code for inter-processor communications at a device is described. The code may include instructions executable by a processor to determine a configuration for a memory component of the device, the configuration indicating a set of multiple processors that share the memory component and indicating one or more permissions for a memory resource of the memory component, assign, to a first processor of the set of multiple processors, a permission to write to the memory resource based on the configuration, write first information to the memory resource by the first processor based on the assigned permission to the first processor, and prevent a second processor of the set of multiple processors and a remainder of the set of multiple processors from writing to the memory resource based on the assigned permission to the first processor.

Some examples of the method, apparatuses, and non-transitory computer-readable medium described herein may further include operations, features, means, or instructions for reading the first information from the memory resource by the second processor based on writing the first information to the memory resource by the first processor.

Some examples of the method, apparatuses, and non-transitory computer-readable medium described herein may further include operations, features, means, or instructions for determining a validity of the first information by the second processor based on the reading of the first information from the memory resource by the second processor.

In some examples of the method, apparatuses, and non-transitory computer-readable medium described herein, reading the first information may include operations, features, means, or instructions for reading, by the second processor, a value indicative of the permission from a field of a table associated with the configuration, where the field corresponds to the memory resource.

Some examples of the method, apparatuses, and non-transitory computer-readable medium described herein may further include operations, features, means, or instructions for assigning, to the second processor, the permission to write to the memory resource based on writing the first information to the memory resource by the first processor and preventing the first processor and the remainder of the set of multiple processors from writing to the memory resource based on the assigned permission to the second processor.

Some examples of the method, apparatuses, and non-transitory computer-readable medium described herein may further include operations, features, means, or instructions for writing, to the memory resource and by the second processor, second information in response to the first information based on the assigned permission to the second processor.

Some examples of the method, apparatuses, and non-transitory computer-readable medium described herein may further include operations, features, means, or instructions for assigning, to the first processor by the second processor, the permission to write to the memory resource based on writing the second information and preventing the second processor and the remainder of the set of multiple processors from writing to the memory resource based on the assigned permission to the first processor.

In some examples of the method, apparatuses, and non-transitory computer-readable medium described herein, assigning the permission to the second processor may include operations, features, means, or instructions for writing, by the first processor, a value indicative of the permission to a field of a table associated with the configuration, where the field corresponds to the memory resource.

In some examples of the method, apparatuses, and non-transitory computer-readable medium described herein, the table includes a set of multiple rows, each row corresponding to a respective memory resource and including a set of parameters indicative of the respective memory resource within the memory component.

Some examples of the method, apparatuses, and non-transitory computer-readable medium described herein may further include operations, features, means, or instructions for writing the value indicative of the permission may be based on the assigned permission to the first processor.

Some examples of the method, apparatuses, and non-transitory computer-readable medium described herein may further include operations, features, means, or instructions for resetting the permission to write to the memory resource, where each of the set of multiple processors may be operable to write to the memory resource based on the reset permission.

DETAILED DESCRIPTION

Figure 1:
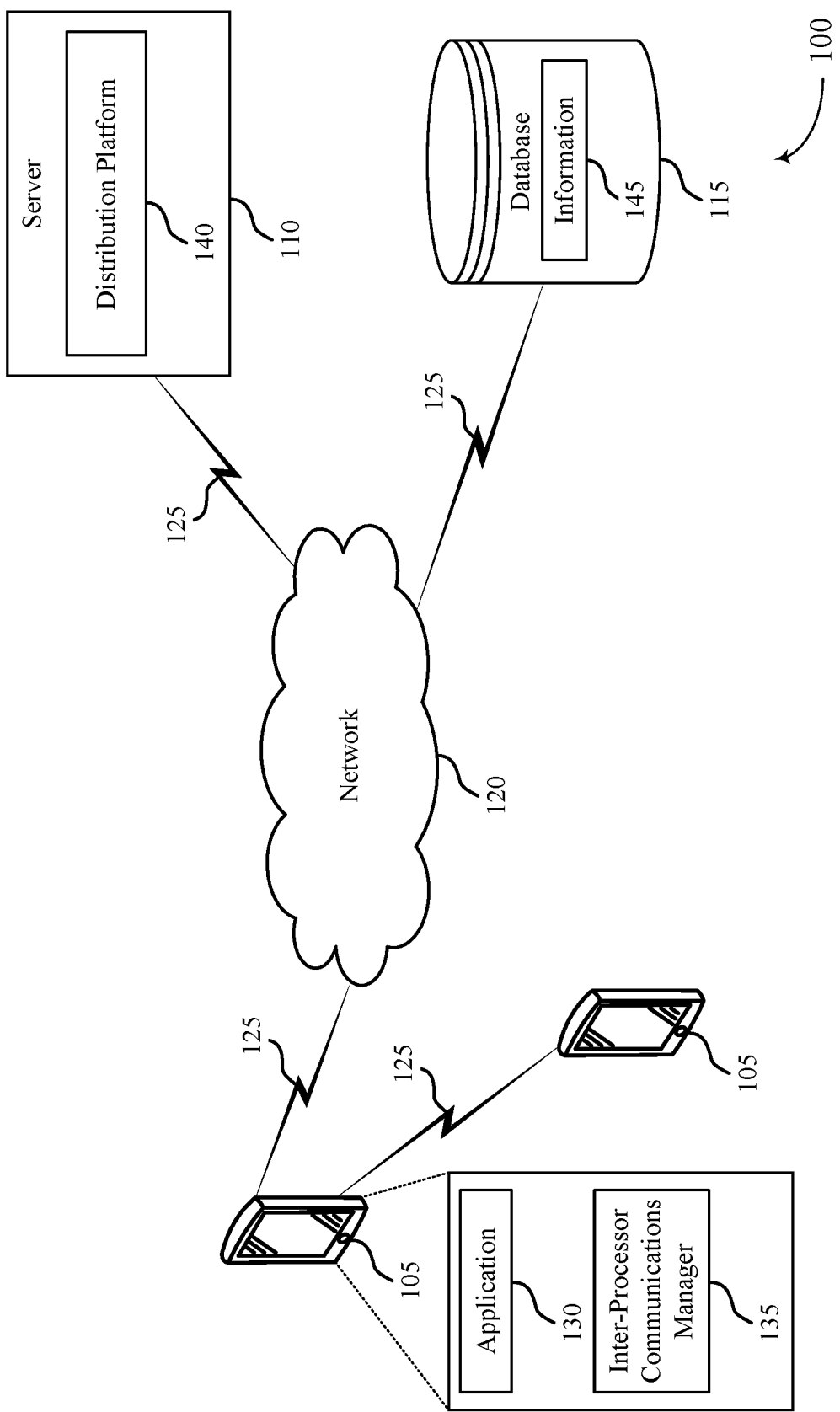
FIG. 1 illustrates an example of a communications system that supports access control configurations for inter-processor communications in accordance with aspects of the present disclosure.

A system-on-chip (SoC) of a device may have multiple processors. Inter-processor communications of the SoC may use shared memory, and employ a zero-copy design to increase a speed of information transfer between processors of the device (e.g., among other advantages). Additional security may be applied at the device based on implementing the zero-copy design. For example, when the processors are in or associated with different security domains additional security may be applied based on the zero-copy design. A processor may receive a message written by another processor to the shared memory, and the receiving processor may determine to temporarily suspend a write permission of the sending processor while the receiving processor parses and validates the message. If the write permission is not suspended, in some cases, the sending processor may be able to launch an attack, such as a time-of-check to time-of-use, which may compromise the receiving processor.

The additional security at the device may be implemented by dynamically configuring a hardware access control circuit block, which may be located between the processors and the shared memory, where the configuring may be performed by a third processor which is trusted by both parties (e.g., the sending and receiving processors). This additional security may increase complexity at the device, performance overhead, and may power overhead. For example, the trusted, third processor may exit from a low power mode when performing the configuring, which may increase complexity and power consumption, and additional inter-processor communications may be used to transfer the configure request to the third processor, which may increase overhead.

Various aspects of the present disclosure relate to techniques to support faster reconfiguration of the dynamic access control configuration. For example, additional configuration fields may be added to existing access control rules, where these additional fields may be configured by the sending processor. The existing (e.g., pre-existing) configuration fields may remain changeable only by the trusted third processor. The additional fields may also include a read-only value which may specify the processor which has exclusive write permission for a memory region of the share memory. This value may indicate the sending processor of the memory region, and the value may be set by the access control hardware when the additional field is changed. By configuring the new fields using the sending processor, the trusted third processor may not be engaged to configure the hardware access control circuit block, and the same security may be achieved. Existing access control rules may be defined by a table, where each row may define a memory region with a start address, size, and respective permissions for each processor. The additional configuration fields may specify a processor which may have an exclusive write permission (e.g., a sending processor).

The processor with the exclusive write permission may change the additional configuration fields, for example, by setting a field for the exclusive write permission to the receiving processor after writing a message on the memory region specified by the same rule table row, which may grant the receiving processor the exclusive write permission to the memory region. When the receiving processor finishes parsing and validating the message, the receiving processor may write a response message in the same region and set the additional field (e.g., indicating the exclusive write permission) back to the sending processor. The entire row in the rule table, including both existing configuration fields and the additional fields, may be readable by the receiving processor, such that the receiving processor may perform further security checks. For example, the receiving processor may verify the memory region is owned by the sending processor.

Aspects of the disclosure are initially described in the context of a communications system. Aspects of the disclosure are further illustrated by and described with reference to a device, a table, a process flow, apparatus diagrams, system diagrams, and flowcharts that relate to access control configurations for inter-processor communications.

FIG. 1 illustrates a communications system 100 for a device that supports access control configurations for inter-processor communications in accordance with aspects of the present disclosure. The communications system 100 may include devices 105, a server 110, and a database 115, among other examples. Although, the communications system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports access control configurations for inter-processor communications, such as packets, data, or control information, via network 120 using communications links 125. In some cases, a portion or all of the techniques described herein supporting access control configurations for inter-processor communications may be performed by the devices 105.

A device 105 may be a cellular phone, a smartphone, a personal digital assistant (PDA), a communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions, data, control information, or commands.

The devices 105 may include an application 130 and an inter-processor communications manager 135. While, the communications system 100 illustrates the devices 105 including both the application 130 and the inter-processor communications manager 135, the application 130 may be an optional feature for the devices 105. In some cases, the application 130 may be a multimedia-based application that can receive (e.g., download, stream, broadcast) from the server 110, database 115 or another device 105, or transmit (e.g., upload) data to the server 110, the database 115, or to another device 105 via using communications links 125.

The inter-processor communications manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, or the like. For example, the inter-processor communications manager 135 may process information (e.g., control information or data) from and write information to a local memory of the device 105 or to the database 115.

The server 110 may be a data server, a cloud server, a server associated with an multimedia subscription provider, proxy server, web server, application server, communications server, home server, mobile server, or any combination thereof. The server 110 may in some cases include a distribution platform 140. The distribution platform 140 may allow the devices 105 to discover, browse, share, and download information via network 120 using communications links 125, and therefore provide a digital distribution of the information from the distribution platform 140. The server 110 may also transmit to the devices 105 a variety of information, such as instructions or commands to download applications or data to the device 105.

The database 115 may store a variety of information, such as instructions or commands. For example, the database 115 may store information 145. The device may support access control configurations for inter-processor communications associated with the information 145. The device 105 may retrieve the stored data from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the communications system 100 may include uplink transmissions from the device 105 to the server 110 and the database 115, and/or downlink transmissions, from the server 110 and the database 115 to the device 105.

The communications links 125 may transmit bidirectional communications and/or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, P2P, LAN, wireless local area network (WLAN), Ethernet, FireWire, fiber optic, and/or other connection types related to communication systems.

A SoC of a device 105 may have multiple processors, that may employ inter-processor communications using shared memory and associated with additional security to prevent malicious attacks. The additional security at the device 105 may be implemented by dynamically configuring a hardware access control circuit block, which may be located between the processors and the shared memory, where the configuring may be performed by a third processor which is trusted by a sending and a receiving processor. This additional security may increase complexity at the device 105, may result in performance overhead, and may increase power overhead, among other examples.

Various aspects of the present disclosure relate to techniques to support faster reconfiguration of the dynamic access control configuration. For example, additional configuration fields may be added to existing access control rules, where these additional fields may be configured by the sending processor. The additional fields may also include a read-only value which may specify the processor which has exclusive write permission for a memory region of the share memory. This value may indicate the sending processor of the memory region, and the value may be set by the access control hardware when the additional field is changed. By configuring the new fields using the sending processor, the trusted, third processor may not be engaged to configure the hardware access control circuit block, and the same security may be achieved.

Figure 2:
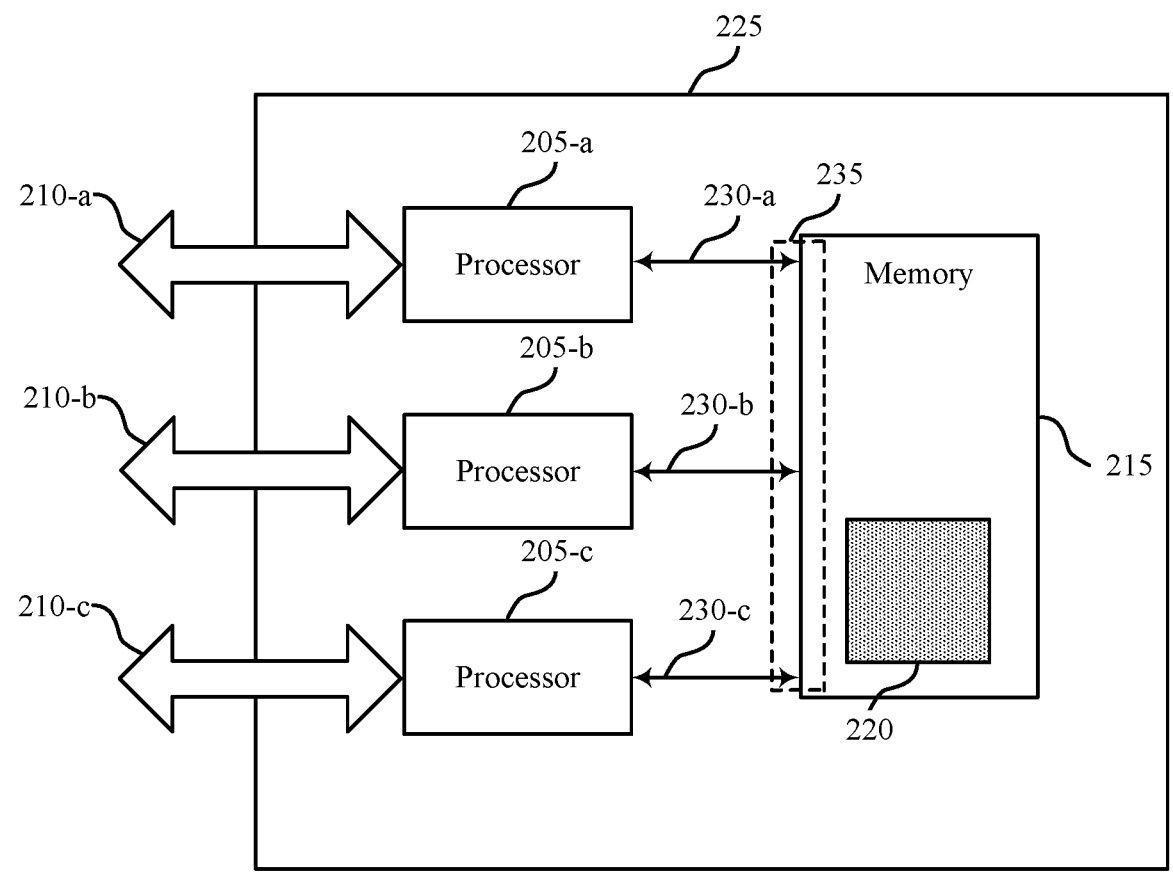
FIG. 2 illustrates an example of a device that supports access control configurations for inter-processor communications in accordance with aspects of the present disclosure.

FIG. 2 illustrates an example of a device 200 that supports access control configurations for inter-processor communications in accordance with aspects of the present disclosure. In some examples, the device 200 may implement aspects of the communications system 100 or may be implemented by aspects of the communications system 100. For example, the device 200 may be an example of a device 105, as described with respect to the communications system 100. The device 200 may include a SoC 225 and may support communication operations on the SoC 225 (e.g., inter-processor communications). The SoC 225 may include processors 205-$a$ through 205-$c$, communication links 210-$a$ through 210-$c$, communication links 230-$a$ through 230-$c$, a hardware access control circuit block 235, a memory component 215, and a memory region 220 within the memory component 215.

The SoC 225 may include multiple processors 205 that may communicate with the memory component 215 and with entities outside of the SoC 225. The processors 205 may perform computations, execute code (e.g., one or more processes) to run the device 200, or may perform other computational tasks. The memory component 215 may include one or more memory regions 220, which may be used to store data and information for the device 200. For example, the memory component 215 may include one or more arrays of memory cells, where each memory cell may be operable to store one or more bits of information.

The processors 205 may support functionality of the SoC 225 and the device 200. Each processor 205 may communicate with the memory component 215 via a respective communication link 230. For example, the processor 205-$a$ may use the communication link 230-$a$ to write information to the memory component 215, the processor 205-$b$ may use the communication link 230-$b$ to write information to memory component 215, and so forth. The processors 205 may each communicate with one or more other components inside or outside of the SoC 225 via a respective communication link 210. For example, other components of the device 200 may communicate with one or more processors 205 of the SoC 225 via a respective communication link 210.

The communication links 230 and the communication links 210 may each be a respective example of a wired connection (e.g., a bus, a buffer, an electrode, an electronic connection), which may, for example, couple one or more of input/output (I/O) ports, pins, pads, or other electrical components of a respective processor 205 and another component, such as the memory component 215. The communication links 230 and the communication links 210 may, in some cases, be the same type of link or may be different types of links. In some cases, the type of communication link 210 may depend on the external component or device with which one or more of the processors 205 may communicate. In some cases, the type of communication link 230 may depend on a type of information that the processor 205-$a$ writes to the memory component 215. As such, different processors 205 may be associated with one or more same communication links 210 and 230, or with one or more different communication links 210 and 230, or both.

The processors 205 may employ a zero-copy design to increase a speed of information transfer (e.g., among other advantages). For example, the zero-copy design may limit information to be stored at one memory location (e.g., not copied to additional memory regions) to reduce memory use. In some cases, the processors 205 may operate in parallel, for example, all accessing the memory region 220 to read or write information that is exclusive to the memory region 220. While the zero-copy design may reduce memory use and overhead, it may also be more susceptible to security risks due to lack of information back-ups. Additional security may be applied at the device 200 based on implementing the zero-copy design.

In some cases, two or more of the processors 205 may be associated with different security domains (e.g., each processor 205 may be associated with a respective security domain). In such cases, additional security may be applied based on the zero-copy design. For example, the processor 205-$a$ may write a message to the memory component 215 and the processor 205-$b$ may receive the message at the memory component 215 (e.g., may access the memory component 215 to read the message written to the memory component 215). The processor 205-$b$ may temporarily suspend the write permissions of the processor 205-$a$ while the processor 205-$b$ parses and validates the message. By temporarily suspending write permissions of the processor 205-$a$, the processor 205-$b$ may, in some cases, prevent malicious attacks (e.g., a time-of-check to time-of-use) that may, for example, originate from outside of the processor 205-$b$, such as from outside of the device 200.

In some cases, the processor 205-$c$ may represent a processor that is "trusted" (e.g., has been verified) by both the processor 205-$a$ and the processor 205-$b$. As such, the processor 205-$c$ may dynamically configure the hardware access control circuit block 235 to implement the additional security at the device 200. One or more models (e.g., a designated processor model, an ownership model) may exist to determine which processor 205 or component of the device 200 may configure the hardware access control circuit block 235. In some cases, the hardware access control circuit block 235 may be part of or may interface with the memory component 215. In some cases, the hardware access control circuit block 235 may communicate with the processors 205 via the communications links 230 to configure aspects of the memory component 215.

The hardware access control circuit block 235 may support additional security at the device 200 by controlling access to the memory component 215. For example, the hardware access control circuit block 235 may act as an additional layer between the processors 205 and the memory component 215. In some cases, for example, the hardware access control circuit block 235 may be configured to identify, intercept, or otherwise prevent malicious attacks originating from information written to the memory component 215. For example, the hardware access control circuit block 235 may enforce one or more preconfigured rules for accessing the memory component 215 (e.g., or a region thereof) by one or more processors 205. The rules may be enforced by the hardware access control circuit block 235 at the memory component 215, the processor 205, or both.

In some cases, the additional security may increase complexity and performance overhead (e.g., signaling overhead, computational overhead) at the device 200, thus increasing power use and decreasing efficiency. For example, the processor 205-c may exit from a low-power mode when performing the configuring of the hardware access control circuit block 235, which may further increase complexity and power use at the processor 205-c. In some cases, additional inter-processor communications to transfer a request from the processor 205-b to the processor 205-c to configure the access control circuit block, and for the processor 205-c to configure the hardware access control circuit block 235, may further increase overhead.

To support faster reconfiguration of the dynamic access control configuration, the memory component 215 may be configured with one or more additional configuration fields for control rules (e.g., existing access control rules). For example, an additional field of the control rules may indicate a processor 205 that has permission to write to the memory component 215 (e.g., processor 205-a). In some cases, each section or group of fields of the control rules indicating the write permission may correspond to a region of memory (e.g., memory region 220, or other memory region). The processor 205 with the write permission (e.g., processor 205-a) for a memory region may be operable to configure the additional field(s) of the control rules for that memory region, while the processor 205-c may configure the already existing fields. In some cases, the additional field(s) may include a read-only value or field (e.g., read-only to other processors 205 which do not have write permissions), which may specify a processor 205 which may have exclusive write permission for the memory component 215 (e.g., processor 205-a). The processor 205-a may reconfigure the additional field(s) of the control rules so that the processor 205-c may avoid that task (e.g., thereby avoiding exiting the low-power mode) and reduce the power use of the device 200. In such cases, the control rules may be enforced by the hardware access control circuit block 235 at the memory component 215, as opposed to one of the processors 205.

In some cases, the processor 205-a with the exclusive write permission (e.g., indicated by the additional fields) may change the additional configuration field(s). For example, the processor 205-a may write information to the memory region 220 while the processor 205-a has exclusive write permission. Once the processor 205-a has completed writing the information, the processor 205-a may change one or more of the additional configuration fields to give exclusive write permission to another processor, such as the processor 205-b (e.g., a processor 205 for which the written information is intended). The processor 205-b may read and validate the message written by the processor 205-a, and may write a response (e.g., additional, or second, information) to the same memory region 220.

Once the processor 205-b has completed its message, the processor 205-b may change the additional field to give exclusive write permission back to the processor 205-a. Following this scheme, one processor 205 at a time may have exclusive write access to the memory component 215, thus keeping the device 200 secure. Additionally, this scheme provides for write permissions to be granted by the processor 205 that has just finished writing a message, preventing unnecessary "wake-ups" of additional processors 205 (e.g., a trusted processor 205), which may save energy. The described techniques may reduce overhead and improve energy efficiency while maintaining a higher level of security at the device 200. For example, the write permission may, in some cases, automatically enforce a single write from a single processor 205, while preventing malicious attacks such as time-of-check to time-of-use. Further the write permission may reduce or eliminate reconfiguration overhead for determining write permissions.

Figure 3:
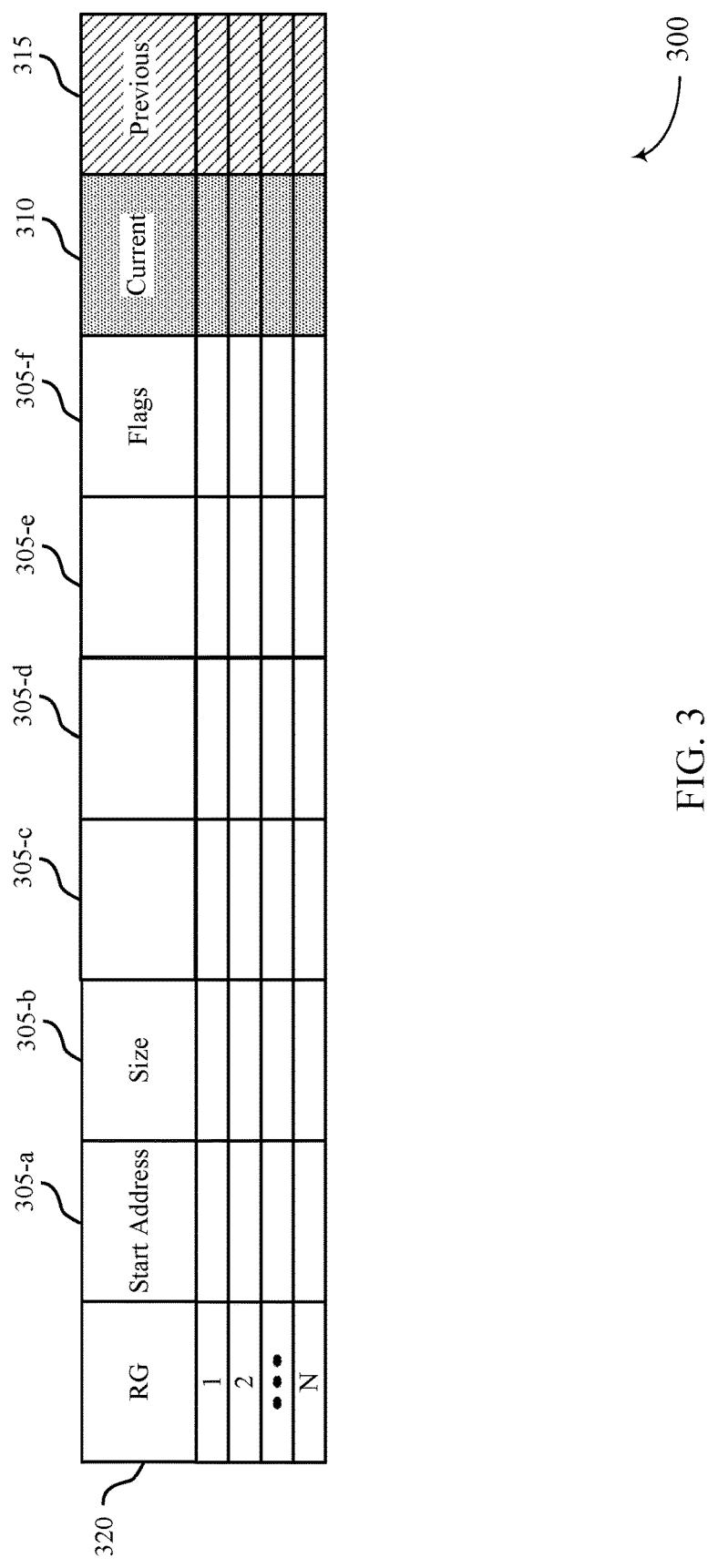
FIG. 3 illustrates an example of a table that supports access control configurations for inter-processor communications in accordance with aspects of the present disclosure.

FIG. 3 illustrates an example of a table 300 that supports access control configurations for inter-processor communications in accordance with aspects of the present disclosure. In some examples, the table 300 may implement aspects of the communications system 100 or the device 200 or may be implemented by aspects of the communications system 100 or the device 200. For example, the table 300 may indicate one or more access parameters for a memory component 215, and one or more memory regions 220 of the memory component, as described with respect to FIG. 2. In some cases, the fields of the table 300 may be written or configured by one or more processors 205 as described with reference to FIG. 2. The table 300 may include one or more fields, where each field may indicate one or more aspects of configuring permissions for access (e.g., read and write permissions) to a memory component of a device, as described with reference to FIG. 2.

The table 300 may include a set of fields, each relating to one or more aspects of accessing shared memory (e.g., a memory component, or a region thereof). For example, each row of the table 300 may indicate one or more parameters for a respective resource group, or a memory region, of the memory component. Each of columns 305-a through 305-e may include a parameter representative of a corresponding characteristic of a resource group. For example, a first column 305-a may correspond to a start address for a resource group, a second column 305-b may correspond to a size for a resource group, and so on. In some cases, the fields of these columns, for each resource group, may be written by a trusted processor of the device. For example, the trusted processor may be verified as secure both by the memory component and by one or more other processors accessing the memory component (e.g., sharing the memory component).

In some cases, a column 305-f may indicate one or more "flags" associated with a resource group (e.g., events that may trigger a specific protocol for the processors and/or memory component). For example, in some cases, a flag in the column 305-*f* may indicate which processor has default writing permission (e.g., when no permission changes have been implemented). In some cases, a flag may indicate whether the writing permissions may be reassigned if there is a system restart (e.g., a behavior if a current writing processor crashes). In some cases, a flag may indicate whether an interrupt protocol (e.g., steps for addressing anomalous system behavior) is triggered if writing permissions are transferred to another processor. The column 305-*f* (e.g., the flags written to the column 305-*f*) may be written by the trusted processor (e.g., the processor that writes columns 305-*a* through 305-*e*).

The table 300 may also include a column 310. In some cases, the column 310 may include current information (e.g., fields that may be written in real time). The column 310 may be written by a processor having current permission to write to the memory component, where the writing processor may set one bit of information at the column 310 at any time. In some cases, if there has been no previous information written to the column 310, any processor may write information to the column 310. In some cases, a processor with current writing permission may hand off the permission to another processor by indicating the other processor in the column 310 (e.g., writing a value indicative of the other processor), as described with reference to FIG. 2.

The table 300 may further include a column 315. In some cases, the column 315 may include previous information (e.g., fields that were previously entered in the column 310). For example, if the writing permission transfers from a first processor to a second processor, one or more fields of the column 310 written by the first processor may transfer to the column 315. Thus, the column 310 may become available for the processor with new writing permission. The column 315 may thus be referred to as a read-only column. For example, the second processor may read the entries written by the first processor in the column 315, but to respond the second processor may write to the column 315 (e.g., after being assigned the write permission). The column 315 may be updated with the previous information from the column 310 each time the writing permission is transferred to a new processor.

Figure 4:
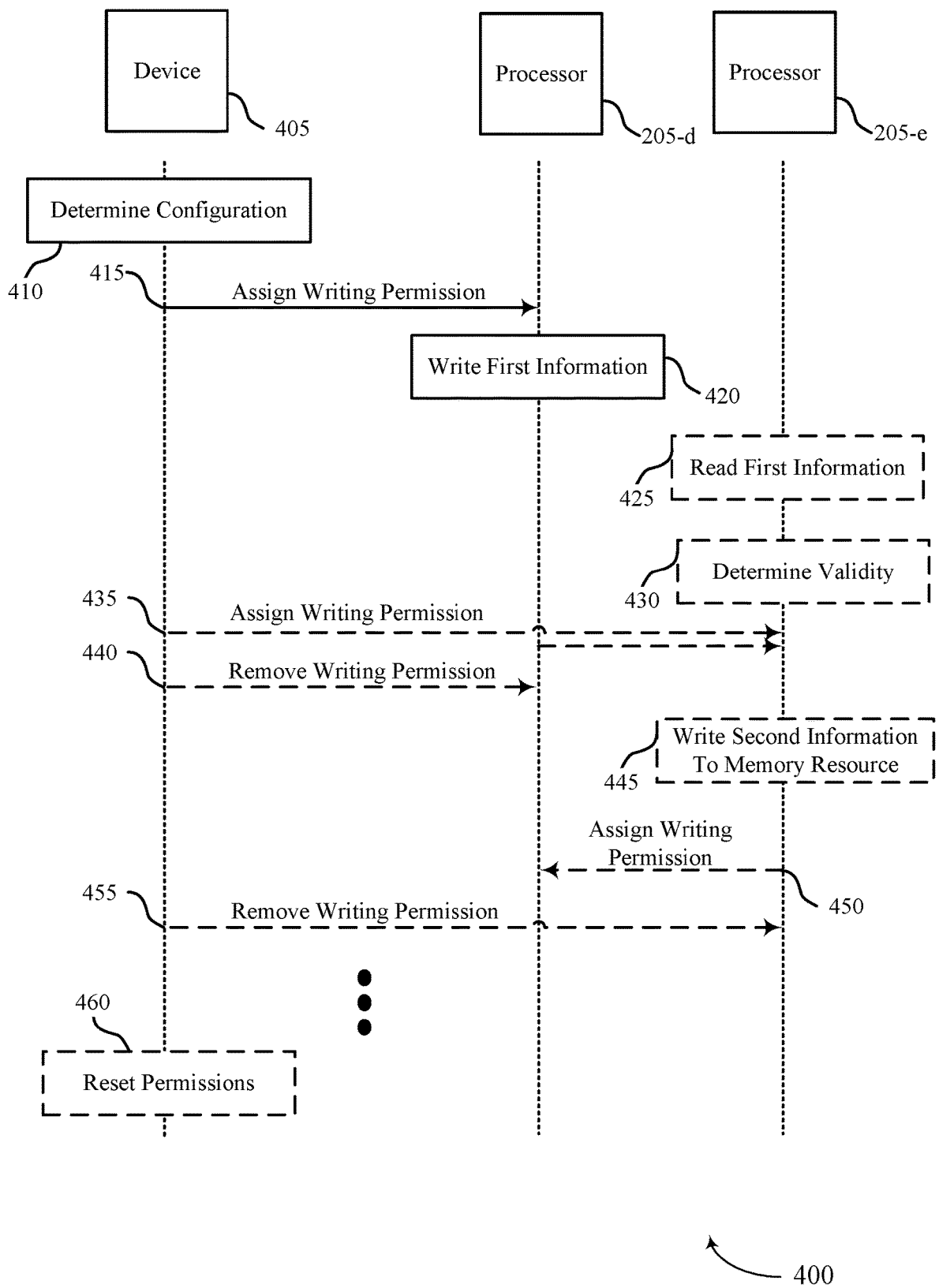
FIG. 4 illustrates an example of a process flow that supports access control configurations for inter-processor communications in accordance with aspects of the present disclosure.

FIG. 4 illustrates an example of a process flow 400 that supports access control configurations for inter-processor communications in accordance with aspects of the present disclosure. The process flow 400 may implement or may be implemented by a device 405, which may include multiple processors 205 (e.g., processors 205-*d* and 205-*e*), which may be examples of a respective device and processors as described with reference to FIGS. 1 through 3. The device 405 and the processors 205-*d* and 205-*e* may be coupled via a respective physical and logical interface that may support communication between the processors 205 and one or more components of the device 405 (e.g., a shared memory component, a controller). The device 405 may be an example of a device 105 as described with reference to FIG. 1, or may be an example of another device that uses an SoC and is configured to operate in response to commands from the processor(s) 205 or SoC.

At 410, the device 405 (e.g., an SoC, processor, or controller of the device 405) may determine a configuration for a memory component (e.g., shared memory component) of the device 405 (e.g., of the SoC). The configuration may indicate multiple processors 205 that share the memory component, which may include processors 205-*d* and 205-*e*. The configuration may also indicate one or more permissions for a memory resource (e.g., a memory region) of the memory component, and may indicate a set of one or more processors 205 of the multiple processors 205 associated with the memory resource. For example, the configuration may indicate which of the processors 205 may receive initial writing permissions to the memory component. In some cases, the configuration may indicate writing permission for one processor 205. In some cases, the processor 205 that may receive writing permission may be a trusted processor (e.g., verified by both the memory component and other processors) or it may be a sending processor (e.g., a processor intending to write a message to the memory component).

The configuration may additionally indicate one or more parameters of the memory resource, such as a start address, a size, and one or more flags associated with the memory resource, for example, as described with reference to FIG. 3. In some cases, as described with reference to FIG. 3, the configuration may indicate multiple memory resources and corresponding permissions, and other parameters, for the multiple memory resources.

At 415, the device 405 (e.g., an SoC, processor, or controller of the device 405) may assign a permission to write to the memory resource to the processor 205-*d* (e.g., the processor may be indicated, by the configuration, to have the writing permission). For example, the device 405 may indicate (e.g., in a field of a table) that the writing permission is currently assigned to the processor 205-*d*. Based on the configuration indicating that the writing permission is assigned to the processor 205-*d*, the processor 205-*d* may be permitted to write to a specified memory region (e.g., a shared memory region or memory resource, indicated by the configuration or table) of the memory component.

At 420, the processor 205-*d* may write first information to the memory resource (e.g., memory region), for example, based on the assigned permission. In some cases, the information may be a message intended for another processor 205 sharing the memory component (e.g., processor 205-*e*). In some cases, the information may indicate that the processor 205-*e* is to be assigned write permissions to the memory resource, or may indicate other information for communication between processors 205-*d* and 205-*e*, or both. The device 405 (e.g., an SoC, processor, or controller of the device 405) may prevent other processors 205 (e.g., processor 205-*e*) from writing to the memory resource based on the assigned permission to the processor 205-*d*.

At 425, in some cases, the processor 205-*e* may read the first information, from the memory resource, based on the first information being written to the memory resource by the processor 205-*d*. The processor 205-*e*, and any other processors 205 other than the processor 205-*d* (e.g., if the write permission is unchanged), may have read-only permissions to access the memory component. For example, the processor 205-*d* may retain writing permissions as the processor 205-*e* reads the first information, until the processor 205-*d* assigns writing permissions to the processor 205-*e*, or to another processor 205.

At 430, in some cases, the processor 205-*e* may determine a validity of the first information based on reading the first information. For example, the processor 205-*e* may determine whether the first information was written by a trusted source (e.g., a processor 205 that has been verified, or that has write permissions). In some cases, the processor 205-*e* may determine whether the first information is associated with a malicious attack (e.g., from an entity outside the device 405, or from a processor 205 that has been compromised).

In some cases, at 435, the device 405 (e.g., an SoC, processor, or controller of the device 405), or the processor 205-*d*, may assign the permission to write to the memory resource to the processor 205-*e*, for example, based on writing the first information to the memory resource by the processor 205-*d*. Assigning the write permission to the processor 205-*e* may further include preventing (e.g., by the device 405 or a component thereof) other processors 205 (e.g., processor 205-*d*) from writing to the memory resource based on assigning the permission to the processor 205-*e*. For example, in some cases, at 440, the device 405 may remove writing permission from the processor 205-*d* in order to prevent the processor 205-*d* from writing to the memory resource. In some cases, the actions at 435, at 440, or both may be performed such that there may be little or no time in which two processors 205 simultaneously have writing permissions to the memory resource. In some cases, the writing permission assigned to the processor 205-*e* may not be activated until the writing permission has been removed from the processor 205-*d*, or in some cases, assigning the writing permission to the processor 205-*e* may remove the writing permission from the processor 205-*d*. In some cases, the assignment of writing permission to the processor 205-*e* may trigger the first information, or a previous writing permission assigned to the processor 205-*d*, to move to a read-only portion of the memory resource (e.g., a read-only field of a table or configuration, indicating one or more previous processors 205 having been assigned the writing permission).

At 445, in some cases, the processor 205-*e* may write second information to the memory resource, which may be in response to the first information and may be based on the assigned writing permission to the processor 205-*e*. In some cases, the processor 205-*e* may write to the same area of the memory resource as the processor 205-*d* (e.g., which may be available based on the change in writing permissions). In some other cases, the processor 205-*e* may write to a different memory resource of the same, shared memory component. The second information may include a message related to the first information (e.g., a response to the processor 205-*d*). In some cases, the second information may indicate a next processor 205 to be assigned write permission.

At 450, in some cases, the processor 205-*e* may assign the permission to write to the memory resource to another processor 205 (e.g., to the processor 205-*d*), for example, based on writing the second information. In some cases, the processor 205-*e* may do so to request a response from the processor 205-*d*, related to the second information. Assigning the permission may further include preventing (e.g., by the device 405 or a component thereof) the processor 205-*e* and other processors from writing to the memory resource based on the writing permission being assigned to the processor 205-*d*. In some cases, the processor 205-*e* may indicate the permission assignment to the processor 205-*d* via the second information written to the memory resource. For example, the processor 205-*e* may write a value to a field of a table or configuration related to the memory resource, where the field may indicate writing permissions for the processors 205 sharing the memory resource. In some cases, at 455, the device 405 may remove writing permission from the processor 205-*e*, for example, based on or in response to assigning the writing permission to the processor 205-*d*. The assigning at 450 and the removing at 455 may be performed such that the processors 205-*d* and 205-*e* may not have simultaneous writing permission, as described herein. In some cases, assigning the writing permission to the processor 205-*d* may remove the writing permission from the processor 205-*e*.

At 460, in some cases, the device 405 (e.g., a processor, SoC, or other component thereof) may reset the permission to write to the memory resource (e.g., may reset all memory resource permissions). For example, the SoC may revert to an original configuration (e.g., a default setting). In some cases, the device 405 may reset the permissions after a number of iterations of the processes described with reference to 410 through 455, or variations thereof. For example, the device 405 may reset the permissions when the processors 205-*d* and 205-*e* have concluded one or more techniques described herein for inter-processor communications. In some cases, resetting the permissions may result in each of the set of processors associated with the memory resource being operable to write to the memory resource.

Figure 5:
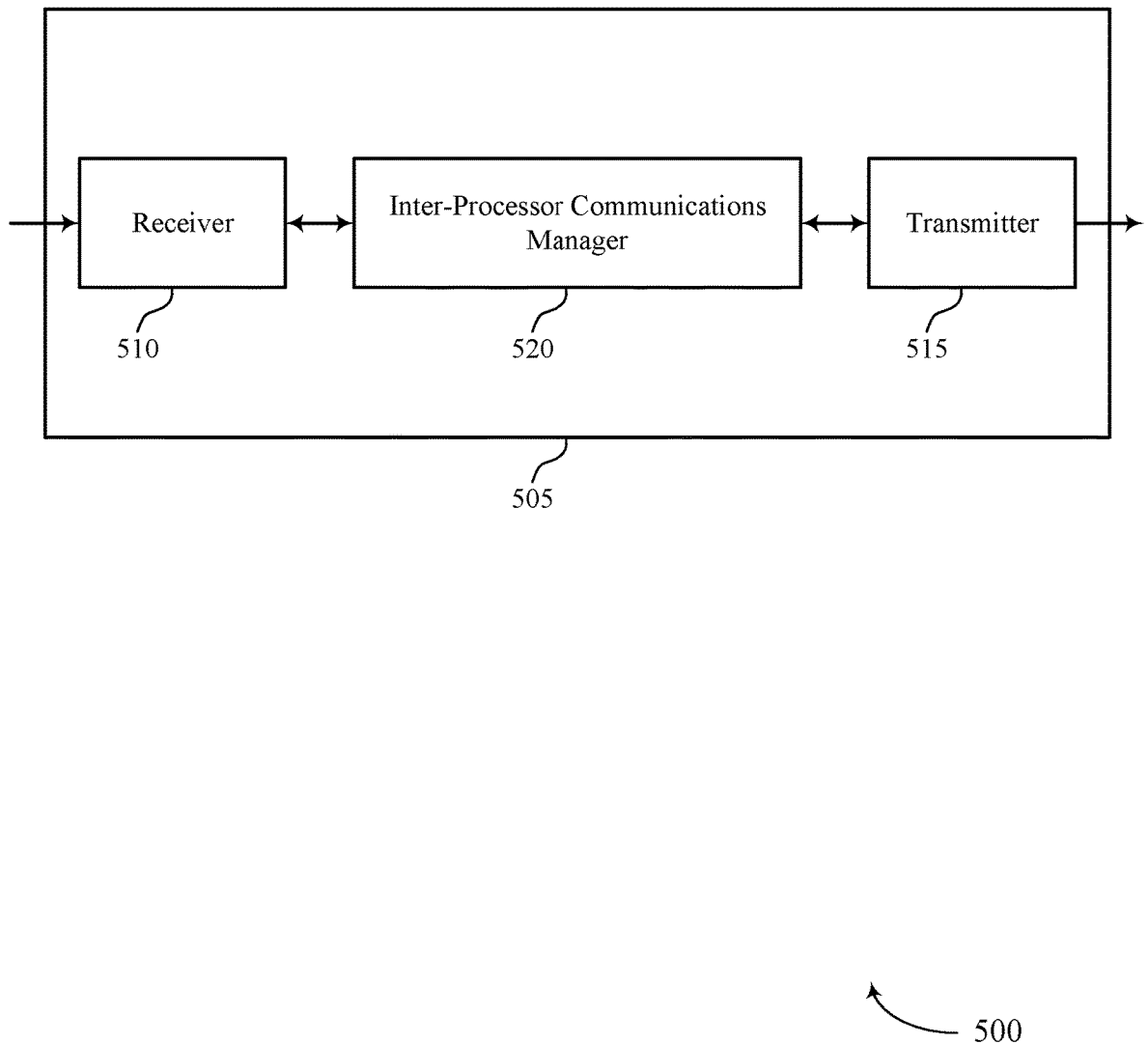
FIGS. 5 and 6 show block diagrams of devices that support access control configurations for inter-processor communications in accordance with aspects of the present disclosure.

FIG. 5 shows a block diagram 500 of a device 505 that supports access control configurations for inter-processor communications in accordance with aspects of the present disclosure. The device 505 may be an example of aspects of a device as described herein. The device 505 may include a receiver 510, a transmitter 515, and an inter-processor communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to access control configurations for inter-processor communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to access control configurations for inter-processor communications). In some examples, the transmitter 515 may be co-located with a receiver 510 in a transceiver module. The transmitter 515 may utilize a single antenna or a set of multiple antennas.

The inter-processor communications manager 520, the receiver 510, the transmitter 515, or various combinations thereof or various components thereof may be examples of means for performing various aspects of access control configurations for inter-processor communications as described herein. For example, the inter-processor communications manager 520, the receiver 510, the transmitter 515, or various combinations or components thereof may support a method for performing one or more of the functions described herein.

In some examples, the inter-processor communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the inter-processor communications manager 520, the receiver 510, the transmitter 515, or various combinations or components thereof may be implemented in code (e.g., as communications management software or firmware) executed by a processor. If implemented in code executed by a processor, the functions of the inter-processor communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the inter-processor communications manager 520 may be configured to perform various operations (e.g., receiving, monitoring, transmitting) using or otherwise in cooperation with the receiver 510, the transmitter 515, or both. For example, the inter-processor communications manager 520 may receive information from the receiver 510, send information to the transmitter 515, or be integrated in combination with the receiver 510, the transmitter 515, or both to receive information, transmit information, or perform various other operations as described herein.

The inter-processor communications manager 520 may support inter-processor communications at the device 505 in accordance with examples as disclosed herein. For example, the inter-processor communications manager 520 may be configured as or otherwise support a means for determining a configuration for a memory component of the device 505, the configuration indicating a set of multiple processors that share the memory component and indicating one or more permissions for a memory resource of the memory component. The inter-processor communications manager 520 may be configured as or otherwise support a means for assigning, to a first processor of the set of multiple processors, a permission to write to the memory resource based on the configuration. The inter-processor communications manager 520 may be configured as or otherwise support a means for writing first information to the memory resource by the first processor based on the assigned permission to the first processor. The inter-processor communications manager 520 may be configured as or otherwise support a means for preventing a second processor of the set of multiple processors and a remainder of the set of multiple processors from writing to the memory resource based on the assigned permission to the first processor.

Figure 6:
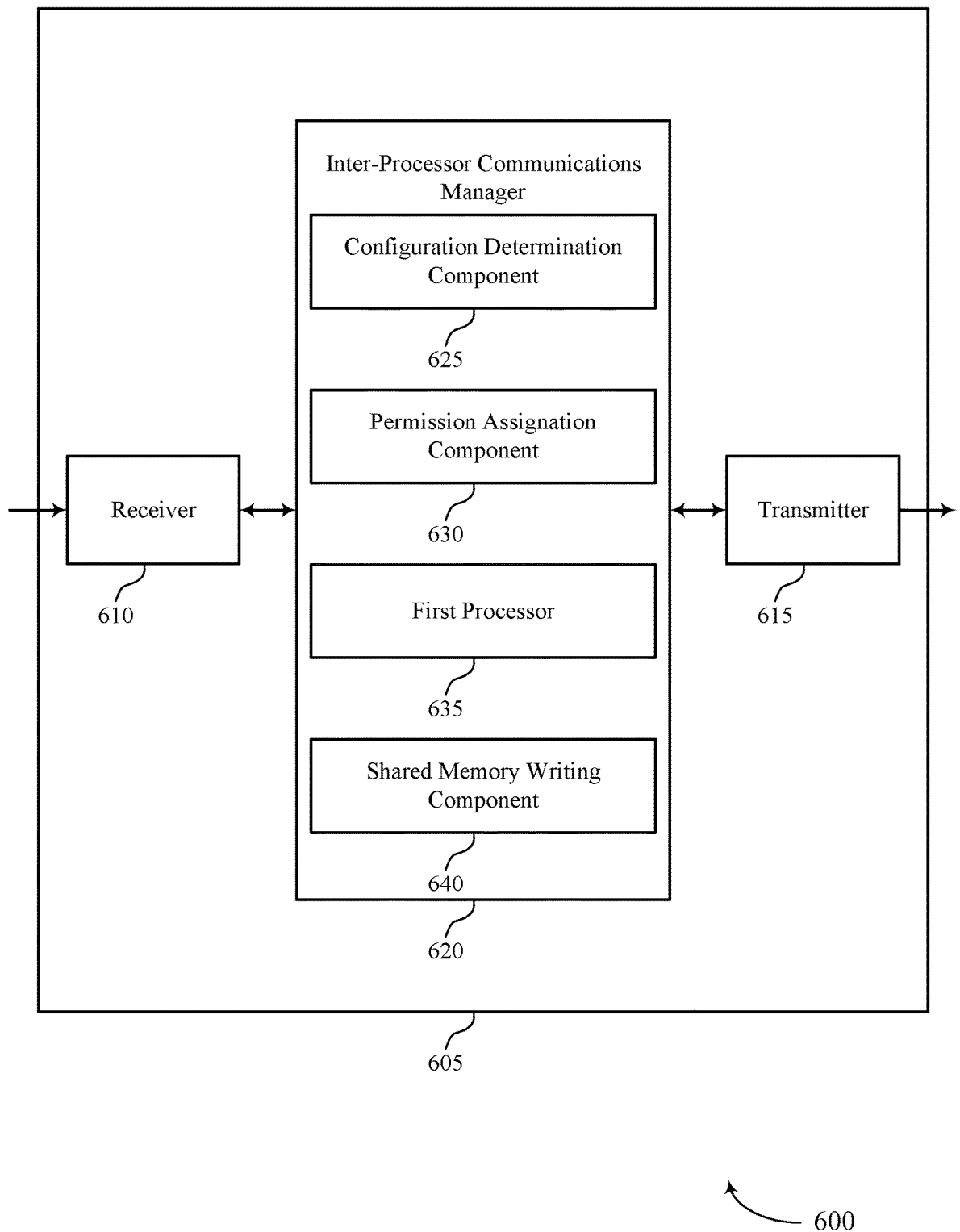

FIG. 6 shows a block diagram 600 of a device 605 that supports access control configurations for inter-processor communications in accordance with aspects of the present disclosure. The device 605 may be an example of aspects of a device 505 or a device 105 as described herein. The device 605 may include a receiver 610, a transmitter 615, and an inter-processor communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to access control configurations for inter-processor communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to access control configurations for inter-processor communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of access control configurations for inter-processor communications as described herein. For example, the inter-processor communications manager 620 may include a configuration determination component 625, a permission assignation component 630, a first processor 635, a shared memory writing component 640, or any combination thereof. The inter-processor communications manager 620 may be an example of aspects of a inter-processor communications manager 520 as described herein. In some examples, the inter-processor communications manager 620, or various components thereof, may be configured to perform various operations (e.g., receiving, monitoring, transmitting) using or otherwise in cooperation with the receiver 610, the transmitter 615, or both. For example, the inter-processor communications manager 620 may receive information from the receiver 610, send information to the transmitter 615, or be integrated in combination with the receiver 610, the transmitter 615, or both to receive information, transmit information, or perform various other operations as described herein.

The inter-processor communications manager 620 may support inter-processor communications at the device 605 in accordance with examples as disclosed herein. The configuration determination component 625 may be configured as or otherwise support a means for determining a configuration for a memory component of the device 605, the configuration indicating a set of multiple processors that share the memory component and indicating one or more permissions for a memory resource of the memory component. The permission assignation component 630 may be configured as or otherwise support a means for assigning, to a first processor of the set of multiple processors, a permission to write to the memory resource based on the configuration. The first processor 635 may be configured as or otherwise support a means for writing first information to the memory resource by the first processor based on the assigned permission to the first processor. The shared memory writing component 640 may be configured as or otherwise support a means for preventing a second processor of the set of multiple processors and a remainder of the set of multiple processors from writing to the memory resource based on the assigned permission to the first processor.

Figure 7:
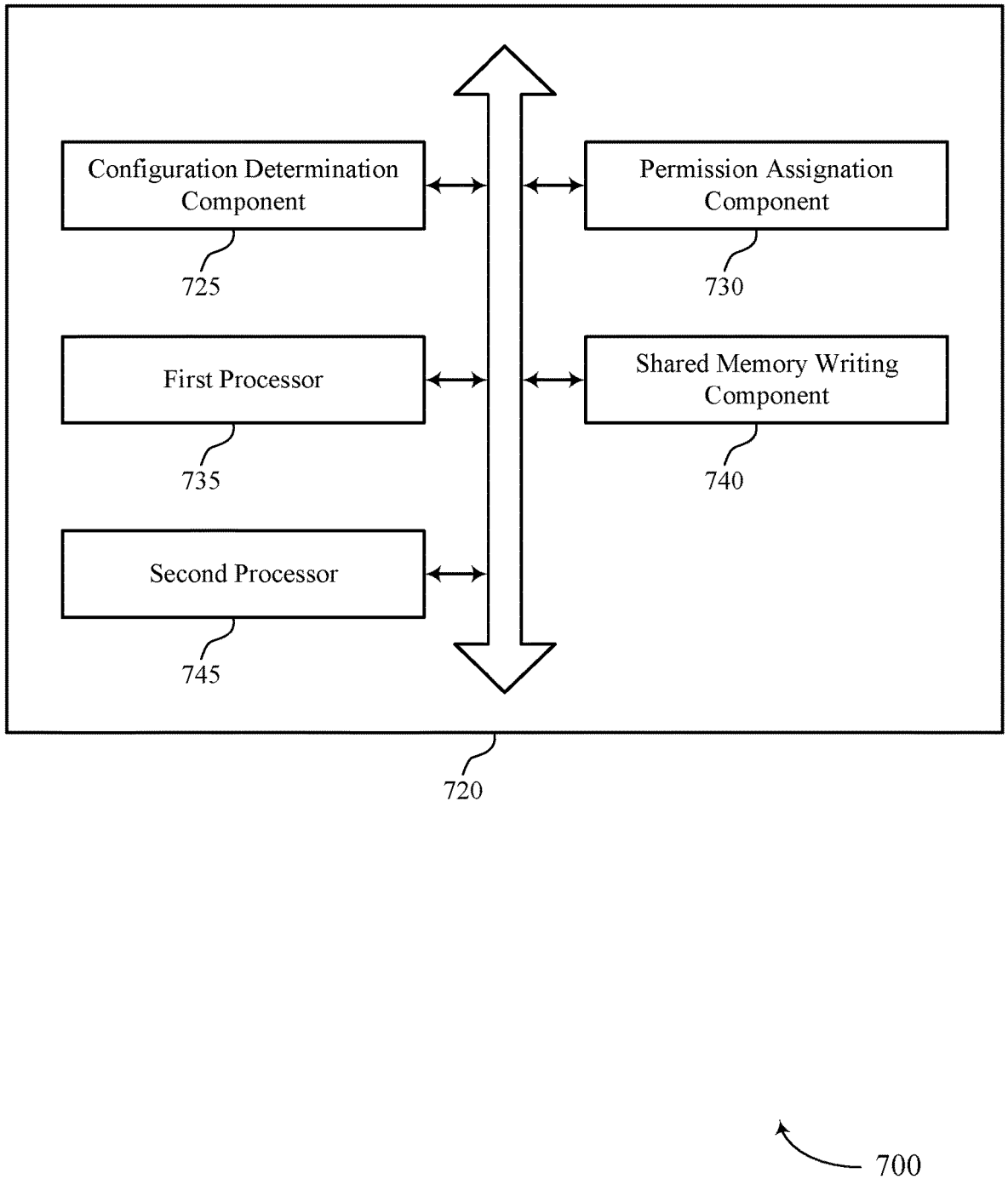
FIG. 7 shows a block diagram of an inter-processor communications manager that supports access control configurations for inter-processor communications in accordance with aspects of the present disclosure.

FIG. 7 shows a block diagram 700 of an inter-processor communications manager 720 that supports access control configurations for inter-processor communications in accordance with aspects of the present disclosure. The inter-processor communications manager 720 may be an example of aspects of an inter-processor communications manager 520, an inter-processor communications manager 620, or both, as described herein. The inter-processor communications manager 720, or various components thereof, may be an example of means for performing various aspects of access control configurations for inter-processor communications as described herein. For example, the inter-processor communications manager 720 may include a configuration determination component 725, a permission assignation component 730, a first processor 735, a shared memory writing component 740, a second processor 745, or any combination thereof. Each of these components may communicate, directly or indirectly, with one another (e.g., via one or more buses).

The inter-processor communications manager 720 may support inter-processor communications at a device in accordance with examples as disclosed herein. The configuration determination component 725 may be configured as or otherwise support a means for determining a configuration for a memory component of the device, the configuration indicating a set of multiple processors that share the memory component and indicating one or more permissions for a memory resource of the memory component. The permission assignation component 730 may be configured as or otherwise support a means for assigning, to a first processor of the set of multiple processors, a permission to write to the memory resource based on the configuration. The first processor 735 may be configured as or otherwise support a means for writing first information to the memory resource by the first processor based on the assigned permission to the first processor. The shared memory writing component 740 may be configured as or otherwise support a means for preventing a second processor of the set of multiple processors and a remainder of the set of multiple processors from writing to the memory resource based on the assigned permission to the first processor.

In some examples, the second processor 745 may be configured as or otherwise support a means for reading the first information from the memory resource by the second processor based on writing the first information to the memory resource by the first processor. In some examples, the second processor 745 may be configured as or otherwise support a means for determining a validity of the first information by the second processor based on the reading of the first information from the memory resource by the second processor. In some examples, to support reading the first information, the second processor 745 may be configured as or otherwise support a means for reading, by the second processor, a value indicative of the permission from a field of a table associated with the configuration, where the field corresponds to the memory resource.

In some examples, the permission assignation component 730 may be configured as or otherwise support a means for assigning, to the second processor, the permission to write to the memory resource based on writing the first information to the memory resource by the first processor. In some examples, the shared memory writing component 740 may be configured as or otherwise support a means for preventing the first processor and the remainder of the set of multiple processors from writing to the memory resource based on the assigned permission to the second processor. In some examples, the second processor 745 may be configured as or otherwise support a means for writing, to the memory resource and by the second processor, second information in response to the first information based on the assigned permission to the second processor.

In some examples, the permission assignation component 730 may be configured as or otherwise support a means for assigning, to the first processor by the second processor, the permission to write to the memory resource based on writing the second information. In some examples, the shared memory writing component 740 may be configured as or otherwise support a means for preventing the second processor and the remainder of the set of multiple processors from writing to the memory resource based on the assigned permission to the first processor.

In some examples, to support assigning the permission to the second processor, the first processor 735 may be configured as or otherwise support a means for writing, by the first processor, a value indicative of the permission to a field of a table associated with the configuration, where the field corresponds to the memory resource. In some examples, the table includes a set of multiple rows, each row corresponding to a respective memory resource and including a set of parameters indicative of the respective memory resource within the memory component. In some examples, writing the value indicative of the permission is based on the assigned permission to the first processor.

In some examples, the permission assignation component 730 may be configured as or otherwise support a means for resetting the permission to write to the memory resource, where each of the set of multiple processors is operable to write to the memory resource based on the reset permission.

Figure 8:
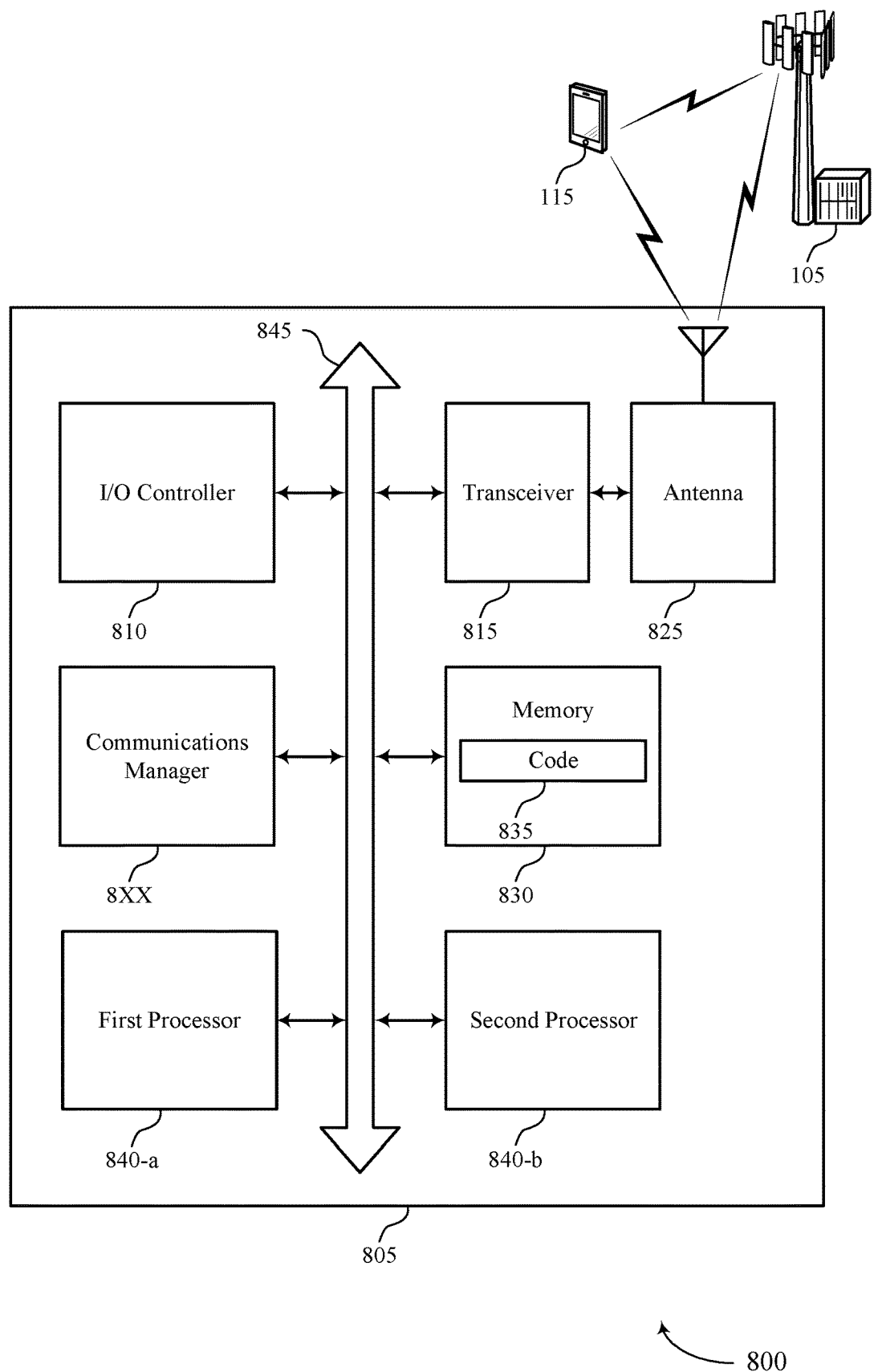
FIG. 8 shows a diagram of a system including a device that supports access control configurations for inter-processor communications in accordance with aspects of the present disclosure.

FIG. 8 shows a diagram of a system 800 including a device 805 that supports access control configurations for inter-processor communications in accordance with aspects of the present disclosure. The device 805 may be an example of or include the components of a device 505, a device 605, or a device as described herein. The device 805 may include components for bi-directional voice and data communications including components for transmitting and receiving communications, such as an inter-processor communications manager 820, an I/O controller 810, a transceiver 815, an antenna 825, a memory 830, code 835, and multiple processors 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the a processor 840-*a* or a processor 840-*b*, or both. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor(s) 840, cause the device 805 to perform various functions described herein. The code 835 may be stored in a non-transitory computer-readable medium such as system memory or another type of memory. In some cases, the code 835 may not be directly executable by the processor(s) 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor(s) 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor(s) 840 may be configured to operate a memory array using a memory controller. In some other cases, a memory controller may be integrated into the processor(s) 840. The processor(s) 840 may be configured to execute computer-readable instructions stored in a memory (e.g., the memory 830) to cause the device 805 to perform various functions (e.g., functions or tasks supporting access control configurations for inter-processor communications). For example, the device 805 or a component of the device 805 may include one or more processors 840 and memory 830 coupled to the processor(s) 840, the processor(s) 840 and memory 830 configured to perform various functions described herein.

The inter-processor communications manager 820 may support inter-processor communications at a device in accordance with examples as disclosed herein. For example, the inter-processor communications manager 820 may be configured as or otherwise support a means for determining a configuration for a memory component of the device 805, the configuration indicating a set of multiple processors that share the memory component and indicating one or more permissions for a memory resource of the memory component. The inter-processor communications manager 820 may be configured as or otherwise support a means for assigning, to a first processor (e.g., the processor 840-a) of the set of multiple processors, a permission to write to the memory resource based on the configuration. The inter-processor communications manager 820 may be configured as or otherwise support a means for writing first information to the memory resource by the first processor (e.g., the processor 840-a) based on the assigned permission to the first processor (e.g., the processor 840-a). The inter-processor communications manager 820 may be configured as or otherwise support a means for preventing a second processor (e.g., the processor 840-b) of the set of multiple processors and a remainder of the set of multiple processors from writing to the memory resource based on the assigned permission to the first processor (e.g., the processor 840-a).

In some examples, the inter-processor communications manager 820 may be configured to perform various operations (e.g., receiving, monitoring, transmitting) using or otherwise in cooperation with the transceiver 815, the one or more antennas 825, or any combination thereof. Although the inter-processor communications manager 820 is illustrated as a separate component, in some examples, one or more functions described with reference to the inter-processor communications manager 820 may be supported by or performed by the processor(s) 840, the memory 830, the code 835, or any combination thereof. For example, the code 835 may include instructions executable by the processor(s) 840 to cause the device 805 to perform various aspects of access control configurations for inter-processor communications as described herein, or the processor(s) 840 and the memory 830 may be otherwise configured to perform or support such operations.

Figure 9:
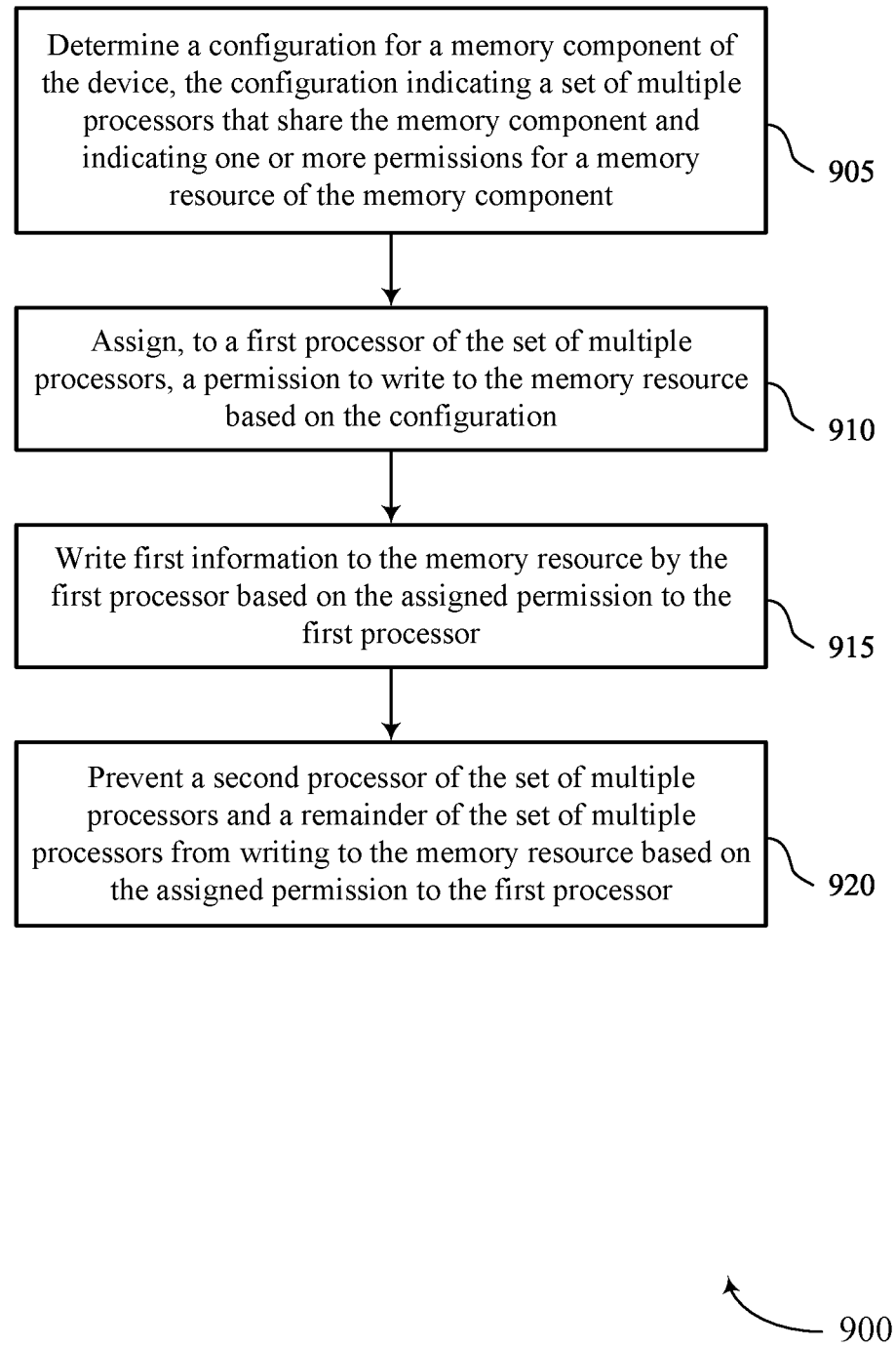
FIGS. 9 through 11 show flowcharts illustrating methods that support access control configurations for inter-processor communications in accordance with aspects of the present disclosure.

FIG. 9 shows a flowchart illustrating a method 900 that supports access control configurations for inter-processor communications in accordance with aspects of the present disclosure. The operations of the method 900 may be implemented by a device or its components as described herein. For example, the operations of the method 900 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 905, the method may include determining a configuration for a memory component of the device, the configuration indicating a set of multiple processors that share the memory component and indicating one or more permissions for a memory resource of the memory component. The operations of 905 may be performed in accordance with examples as disclosed herein. In some examples, aspects of the operations of 905 may be performed by a configuration determination component 725 as described with reference to FIG. 7.

At 910, the method may include assigning, to a first processor of the set of multiple processors, a permission to write to the memory resource based on the configuration. The operations of 910 may be performed in accordance with examples as disclosed herein. In some examples, aspects of the operations of 910 may be performed by a permission assignation component 730 as described with reference to FIG. 7.

At 915, the method may include writing first information to the memory resource by the first processor based on the assigned permission to the first processor. The operations of 915 may be performed in accordance with examples as disclosed herein. In some examples, aspects of the operations of 915 may be performed by a first processor 735 as described with reference to FIG. 7.

At 920, the method may include preventing a second processor of the set of multiple processors and a remainder of the set of multiple processors from writing to the memory resource based on the assigned permission to the first processor. The operations of 920 may be performed in accordance with examples as disclosed herein. In some examples, aspects of the operations of 920 may be performed by a shared memory writing component 740 as described with reference to FIG. 7.

Figure 10:
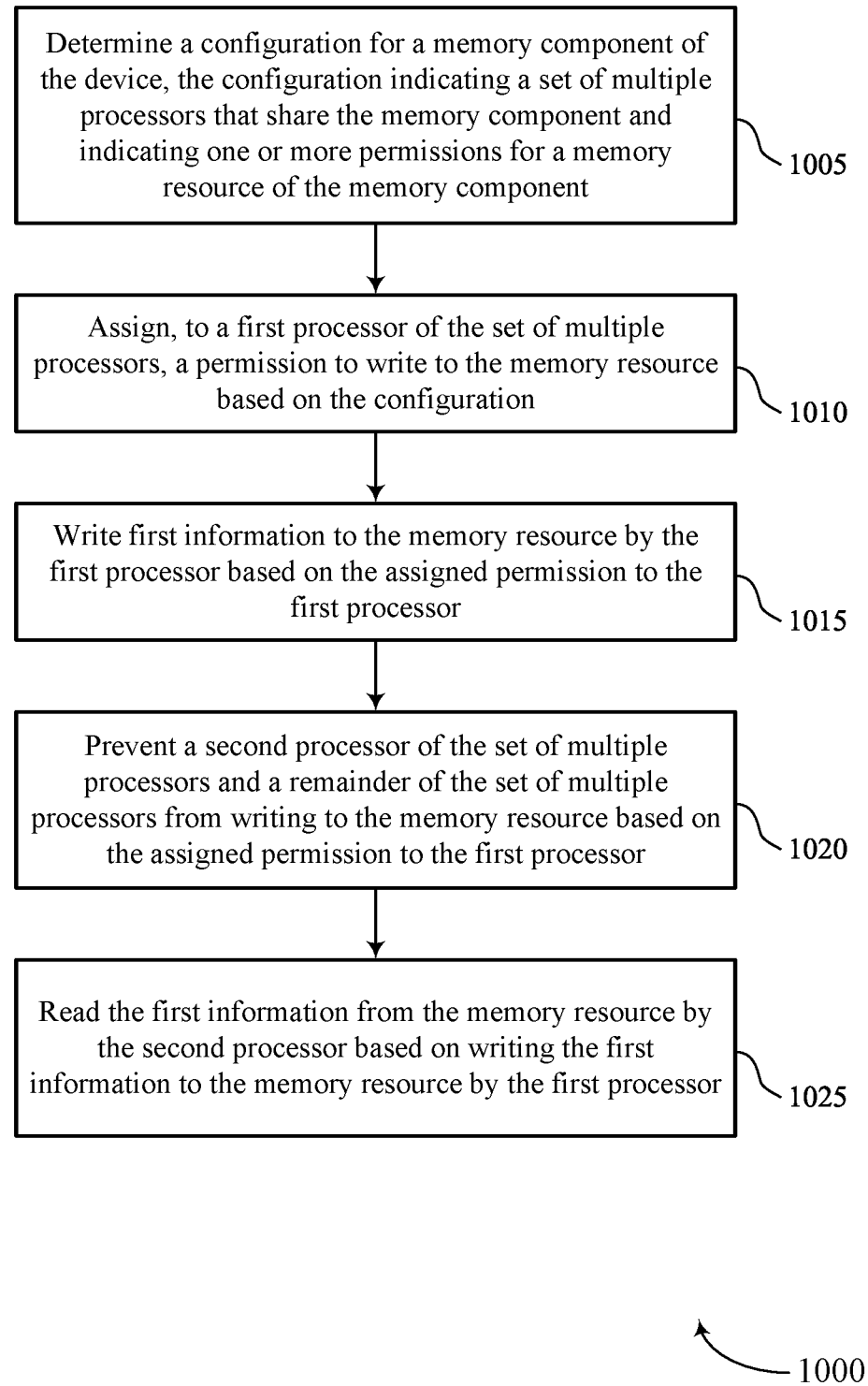

FIG. 10 shows a flowchart illustrating a method 1000 that supports access control configurations for inter-processor communications in accordance with aspects of the present disclosure. The operations of the method 1000 may be implemented by a device or its components as described herein. For example, the operations of the method 1000 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1005, the method may include determining a configuration for a memory component of the device, the configuration indicating a set of multiple processors that share the memory component and indicating one or more permissions for a memory resource of the memory component. The operations of 1005 may be performed in accordance with examples as disclosed herein. In some examples, aspects of the operations of 1005 may be performed by a configuration determination component 725 as described with reference to FIG. 7.

At 1010, the method may include assigning, to a first processor of the set of multiple processors, a permission to write to the memory resource based on the configuration. The operations of 1010 may be performed in accordance with examples as disclosed herein. In some examples, aspects of the operations of 1010 may be performed by a permission assignation component 730 as described with reference to FIG. 7.

At 1015, the method may include writing first information to the memory resource by the first processor based on the assigned permission to the first processor. The operations of 1015 may be performed in accordance with examples as disclosed herein. In some examples, aspects of the operations of 1015 may be performed by a first processor 735 as described with reference to FIG. 7.

At 1020, the method may include preventing a second processor of the set of multiple processors and a remainder of the set of multiple processors from writing to the memory resource based on the assigned permission to the first processor. The operations of 1020 may be performed in accordance with examples as disclosed herein. In some examples, aspects of the operations of 1020 may be performed by a shared memory writing component 740 as described with reference to FIG. 7.

At 1025, the method may include reading the first information from the memory resource by the second processor based on writing the first information to the memory resource by the first processor. The operations of 1025 may be performed in accordance with examples as disclosed herein. In some examples, aspects of the operations of 1025 may be performed by a second processor 745 as described with reference to FIG. 7.

Figure 11:
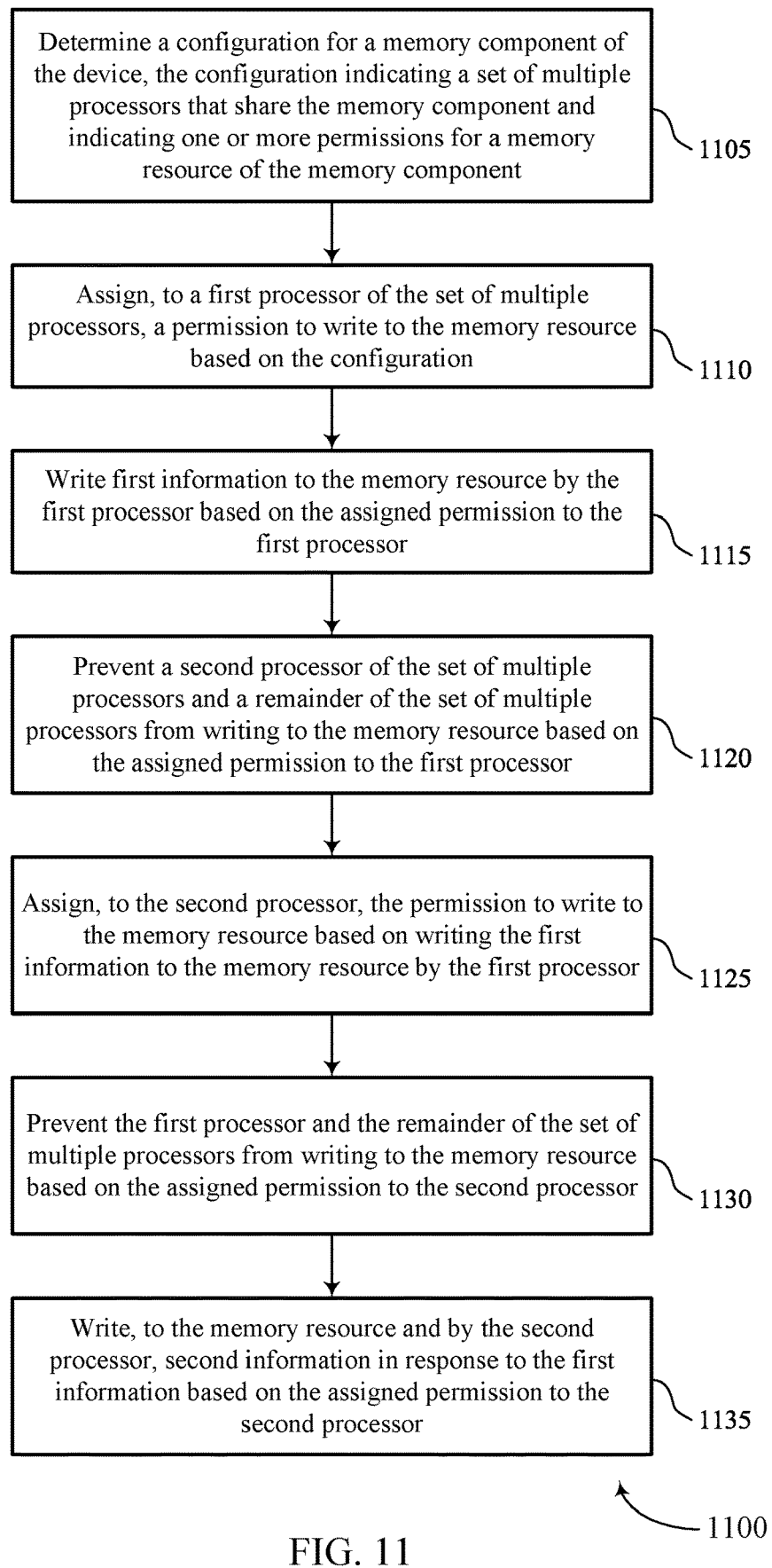

FIG. 11 shows a flowchart illustrating a method 1100 that supports access control configurations for inter-processor communications in accordance with aspects of the present disclosure. The operations of the method 1100 may be implemented by a device or its components as described herein. For example, the operations of the method 1100 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1105, the method may include determining a configuration for a memory component of the device, the configuration indicating a set of multiple processors that share the memory component and indicating one or more permissions for a memory resource of the memory component. The operations of 1105 may be performed in accordance with examples as disclosed herein. In some examples, aspects of the operations of 1105 may be performed by a configuration determination component 725 as described with reference to FIG. 7.

At 1110, the method may include assigning, to a first processor of the set of multiple processors, a permission to write to the memory resource based on the configuration. The operations of 1110 may be performed in accordance with examples as disclosed herein. In some examples, aspects of the operations of 1110 may be performed by a permission assignation component 730 as described with reference to FIG. 7.

At 1115, the method may include writing first information to the memory resource by the first processor based on the assigned permission to the first processor. The operations of 1115 may be performed in accordance with examples as disclosed herein. In some examples, aspects of the operations of 1115 may be performed by a first processor 735 as described with reference to FIG. 7.

At 1120, the method may include preventing a second processor of the set of multiple processors and a remainder of the set of multiple processors from writing to the memory resource based on the assigned permission to the first processor. The operations of 1120 may be performed in accordance with examples as disclosed herein. In some examples, aspects of the operations of 1120 may be performed by a shared memory writing component 740 as described with reference to FIG. 7.

At 1125, the method may include assigning, to the second processor, the permission to write to the memory resource based on writing the first information to the memory resource by the first processor. The operations of 1125 may be performed in accordance with examples as disclosed herein. In some examples, aspects of the operations of 1125 may be performed by a permission assignation component 730 as described with reference to FIG. 7.

At 1130, the method may include preventing the first processor and the remainder of the set of multiple processors from writing to the memory resource based on the assigned permission to the second processor. The operations of 1130 may be performed in accordance with examples as disclosed herein. In some examples, aspects of the operations of 1130 may be performed by a shared memory writing component 740 as described with reference to FIG. 7.

At 1135, the method may include writing, to the memory resource and by the second processor, second information in response to the first information based on the assigned permission to the second processor. The operations of 1135 may be performed in accordance with examples as disclosed herein. In some examples, aspects of the operations of 1135 may be performed by a second processor 745 as described with reference to FIG. 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for inter-processor communications at a device, comprising:
    determining a configuration for a memory component of the device, the configuration indicating a plurality of processors that share the memory component, the configuration associated with a table including a set of fields corresponding to a memory resource, and the set of fields indicating a start memory address for the memory resource, a memory size for the memory resource, a current write permission for the memory resource, and a previous write permission for the memory resource of the memory component;
    assigning, to a first processor of the plurality of processors, a permission to write to the memory resource based at least in part on the configuration;
    writing first information to the memory resource by the first processor based at least in part on the assigned permission to the first processor;
    preventing a second processor of the plurality of processors and a remainder of the plurality of processors from writing to the memory resource based at least in part on the assigned permission to the first processor; and
    resetting the permission to write to the memory resource, wherein each of the plurality of processors is operable to write to the memory resource based at least in part on the reset permission.

2. The method of claim 1, further comprising:
    reading the first information from the memory resource by the second processor based at least in part on writing the first information to the memory resource by the first processor.

3. The method of claim 2, further comprising:
    determining a validity of the first information by the second processor based at least in part on the reading of the first information from the memory resource by the second processor.

4. The method of claim 2, wherein reading the first information comprises:

reading, by the second processor, a value indicative of the current write permission for the memory resource from a field of the set of fields of the table associated with the configuration, wherein the field corresponds to the memory resource.

5. The method of claim 1, further comprising:
assigning, to the second processor, the permission to write to the memory resource based at least in part on writing the first information to the memory resource by the first processor; and
preventing the first processor and the remainder of the plurality of processors from writing to the memory resource based at least in part on the assigned permission to the second processor.

6. The method of claim 5, further comprising:
writing, to the memory resource and by the second processor, second information in response to the first information based at least in part on the assigned permission to the second processor.

7. The method of claim 6, further comprising:
assigning, to the first processor by the second processor, the permission to write to the memory resource based at least in part on writing the second information; and
preventing the second processor and the remainder of the plurality of processors from writing to the memory resource based at least in part on the assigned permission to the first processor.

8. The method of claim 5, wherein assigning the permission to the second processor comprises:
writing, by the first processor, a value indicative of the current write permission for the memory resource to a field of the set of fields of the table associated with the configuration, wherein the field corresponds to the memory resource.

9. The method of claim 8, wherein the table comprises a plurality of rows, each row corresponding to a respective memory resource and comprising a set of fields indicating a start memory address for the respective memory resource, a memory size for the respective memory resource, a current write permission for the respective memory resource, and a previous write permission of for the respective memory resource within the memory component.

10. The method of claim 8, wherein writing the value indicative of the current write permission is based at least in part on the assigned permission to the first processor.

11. An apparatus for inter-processor communications, comprising:
a plurality of processors;
memory coupled with each of the plurality of processors; and
instructions stored in the memory and executable by the plurality of processors to cause the apparatus to:
determine a configuration for a memory component of the apparatus, the configuration indicating that the plurality of processors share the memory component, the configuration associated with a table including a set of fields corresponding to a memory resource, and the set of fields indicating a start memory address for the memory resource, a memory size for the memory resource, a current write permission for the memory resource, and a previous write permission for the memory resource of the memory component;
assign, to a first processor of the plurality of processors, a permission to write to the memory resource based at least in part on the configuration;
write first information to the memory resource by the first processor based at least in part on the assigned permission to the first processor;
prevent a second processor of the plurality of processors and a remainder of the plurality of processors from writing to the memory resource based at least in part on the assigned permission to the first processor; and
reset the permission to write to the memory resource, wherein each of the plurality of processors is operable to write to the memory resource based at least in part on the reset permission.

12. The apparatus of claim 11, wherein the instructions are further executable by the plurality of processors to cause the apparatus to:
read the first information from the memory resource by the second processor based at least in part on writing the first information to the memory resource by the first processor.

13. The apparatus of claim 12, wherein the instructions are further executable by the plurality of processors to cause the apparatus to:
determine a validity of the first information by the second processor based at least in part on the reading of the first information from the memory resource by the second processor.

14. The apparatus of claim 12, wherein the instructions to read the first information are executable by the plurality of processors to cause the apparatus to:
read, by the second processor, a value indicative of the current write permission for the memory resource from a field of the set of fields of the table associated with the configuration, wherein the field corresponds to the memory resource.

15. The apparatus of claim 11, wherein the instructions are further executable by the plurality of processors to cause the apparatus to:
assign, to the second processor, the permission to write to the memory resource based at least in part on writing the first information to the memory resource by the first processor; and
prevent the first processor and the remainder of the plurality of processors from writing to the memory resource based at least in part on the assigned permission to the second processor.

16. The apparatus of claim 15, wherein the instructions are further executable by the plurality of processors to cause the apparatus to:
write, to the memory resource and by the second processor, second information in response to the first information based at least in part on the assigned permission to the second processor.

17. The apparatus of claim 16, wherein the instructions are further executable by the plurality of processors to cause the apparatus to:
assign, to the first processor by the second processor, the permission to write to the memory resource based at least in part on writing the second information; and
prevent the second processor and the remainder of the plurality of processors from writing to the memory resource based at least in part on the assigned permission to the first processor.

18. An apparatus for inter-processor communications, comprising:
means for determining a configuration for a memory component of the apparatus, the configuration indicating a plurality of processors that share the memory component, the configuration associated with a table including a set of fields corresponding to a memory resource, and the set of fields indicating a start memory address for the memory resource, a memory size for the memory resource, a current write permission for the memory resource, and a previous write permission for the memory resource of the memory component;

means for assigning, to a first processor of the plurality of processors, a permission to write to the memory resource based at least in part on the configuration;

means for writing first information to the memory resource by the first processor based at least in part on the assigned permission to the first processor;

means for preventing a second processor of the plurality of processors and a remainder of the plurality of processors from writing to the memory resource based at least in part on the assigned permission to the first processor; and means for resetting the permission to write to the memory resource, wherein each of the plurality of processors is operable to write to the memory resource based at least in part on the reset permission.

\* \* \* \* \*